United States Patent [19]

Gorges

[11] Patent Number: 5,020,861
[45] Date of Patent: Jun. 4, 1991

[54] AIRCRAFT WHEEL HUBCAP

[75] Inventor: Frederick J. Gorges, Bellevue, Wash.

[73] Assignee: The Boeing Company, Seattle, Wash.

[21] Appl. No.: 490,193

[22] Filed: Mar. 8, 1990

[51] Int. Cl.$^5$ .............................................. B60B 7/02
[52] U.S. Cl. ............................ 301/108 R; 301/37 P; 301/6 CS; 188/264 W; 244/111
[58] Field of Search ............ 301/37 P, 108 R, 108 A, 301/6 CS, 6 R, 6 WB, 108 S; 188/181 R, 264 W; 244/111, 103 R; 324/207.22

[56] References Cited

U.S. PATENT DOCUMENTS

| | | | |
|---|---|---|---|
| 1,351,261 | 8/1920 | Miller | 301/108 S |
| 1,561,643 | 11/1925 | Gledhill | 301/108 S |
| 1,936,725 | 11/1933 | Miller | 301/108 R X |
| 2,015,352 | 9/1935 | Reid | 301/108 A |
| 2,022,174 | 11/1935 | Allee | 301/6 CS |
| 2,148,995 | 2/1939 | Nelson | 301/37 C |
| 2,167,102 | 7/1939 | Burger | 301/22 |
| 2,214,457 | 9/1940 | Fuhrman | 301/6 R |
| 3,034,833 | 5/1962 | Ares | 301/37 SA |
| 3,569,695 | 3/1971 | McLean | 246/169 A |
| 3,598,450 | 8/1971 | Brown et al. | 301/108 R |
| 3,606,475 | 9/1971 | Quisenberry | 301/112 |
| 3,619,010 | 11/1971 | Foster | 301/37 P |
| 3,915,266 | 10/1975 | Lantz | 188/181 R |
| 4,067,621 | 1/1978 | Reppert | 301/108 A |
| 4,316,638 | 2/1982 | Spisak | 301/108 S X |
| 4,447,092 | 5/1984 | Beisch | 301/37 P |
| 4,457,560 | 7/1984 | Rowe | 301/37 P |

FOREIGN PATENT DOCUMENTS

| | | | |
|---|---|---|---|
| 2108754 | 9/1971 | Fed. Rep. of Germany . | |
| 1193889 | 11/1959 | France | 301/6 CS |
| 1210695 | 3/1960 | France . | |
| 073852 | 9/1960 | France . | |
| 1033622 | 6/1966 | United Kingdom | 244/103 R |
| 1041628 | 9/1966 | United Kingdom . | |
| 1075709 | 7/1967 | United Kingdom . | |

Primary Examiner—Dennis H. Pedder
Attorney, Agent, or Firm—R. H. Sproule; B. A. Donahue

[57] ABSTRACT

A hubcap for an aircraft wheel includes an internal spider which engages an anti-skid transducer located in the wheel hub. The hubcap is constructed of one piece and has a conical configuration to provide increased strength as well as increased airflow inside the hubcap for improved heat dissipation.

7 Claims, 5 Drawing Sheets

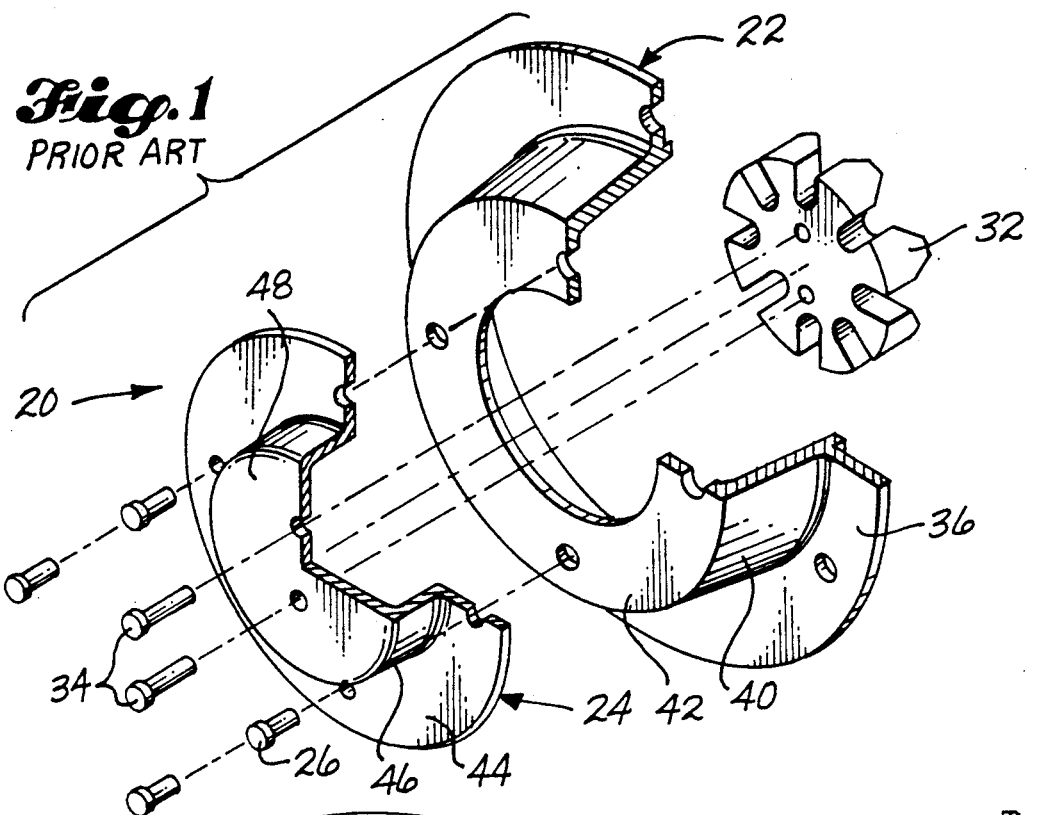
Fig. 1 PRIOR ART
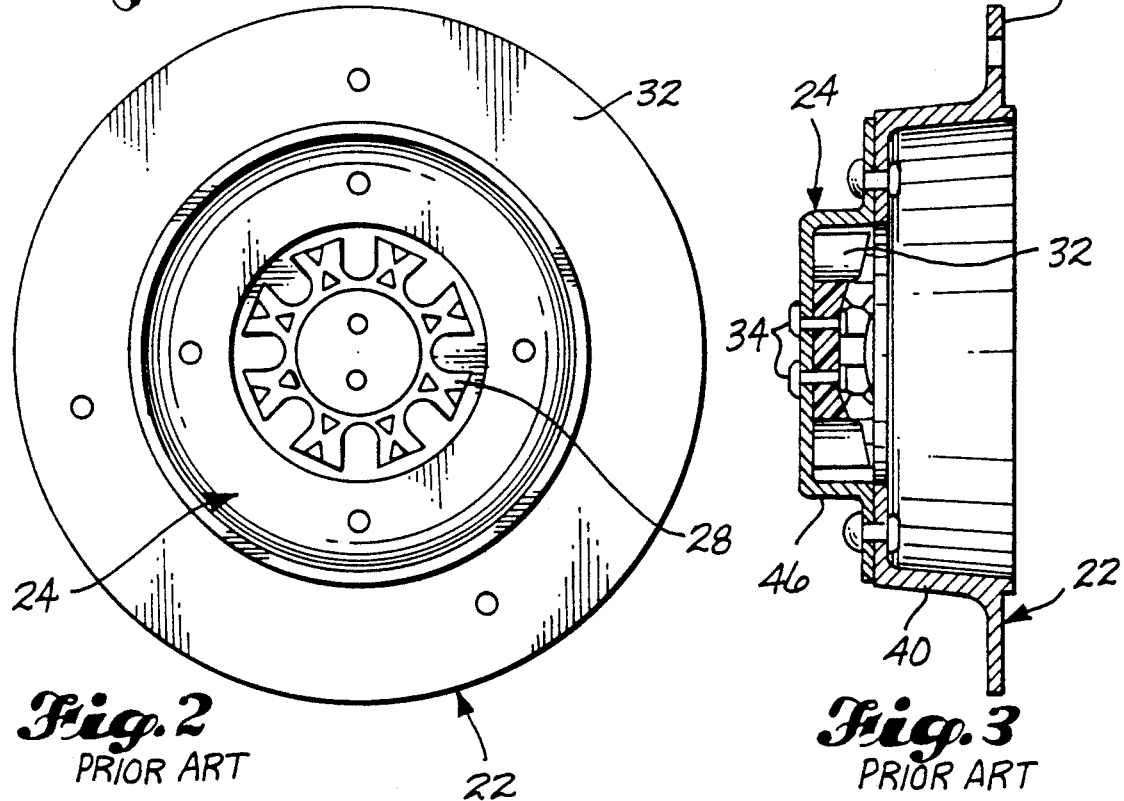
Fig. 2 PRIOR ART
Fig. 3 PRIOR ART

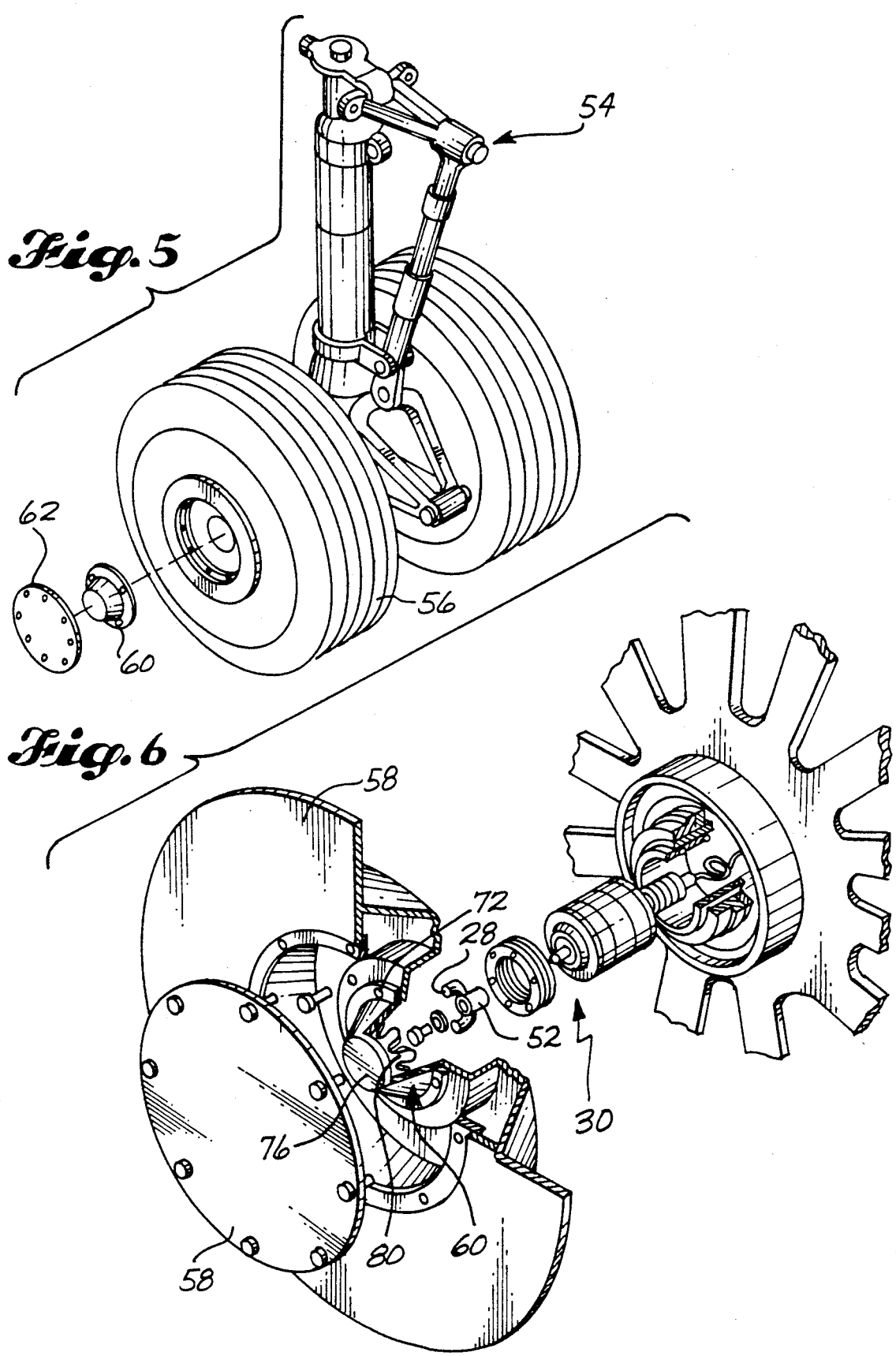

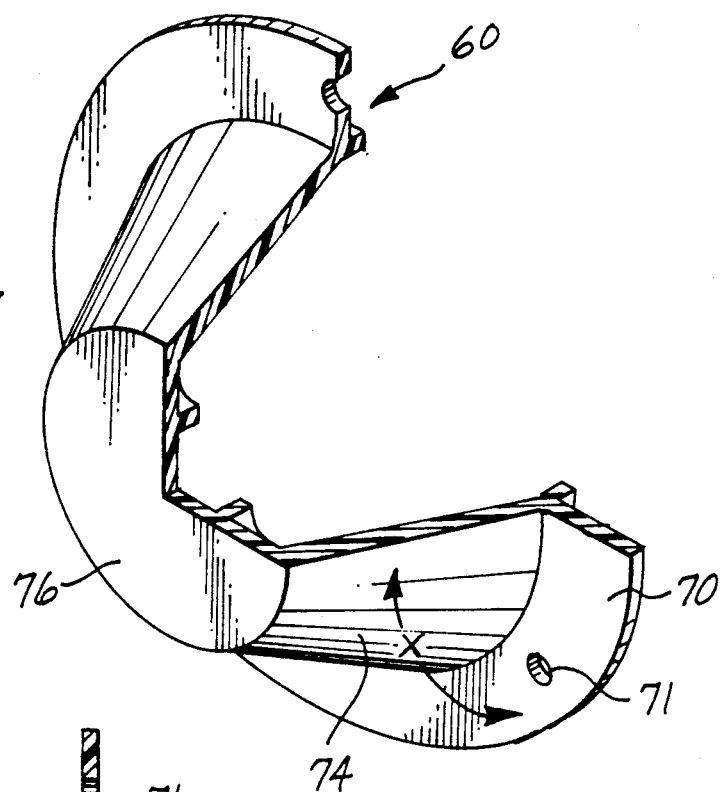
Fig. 7
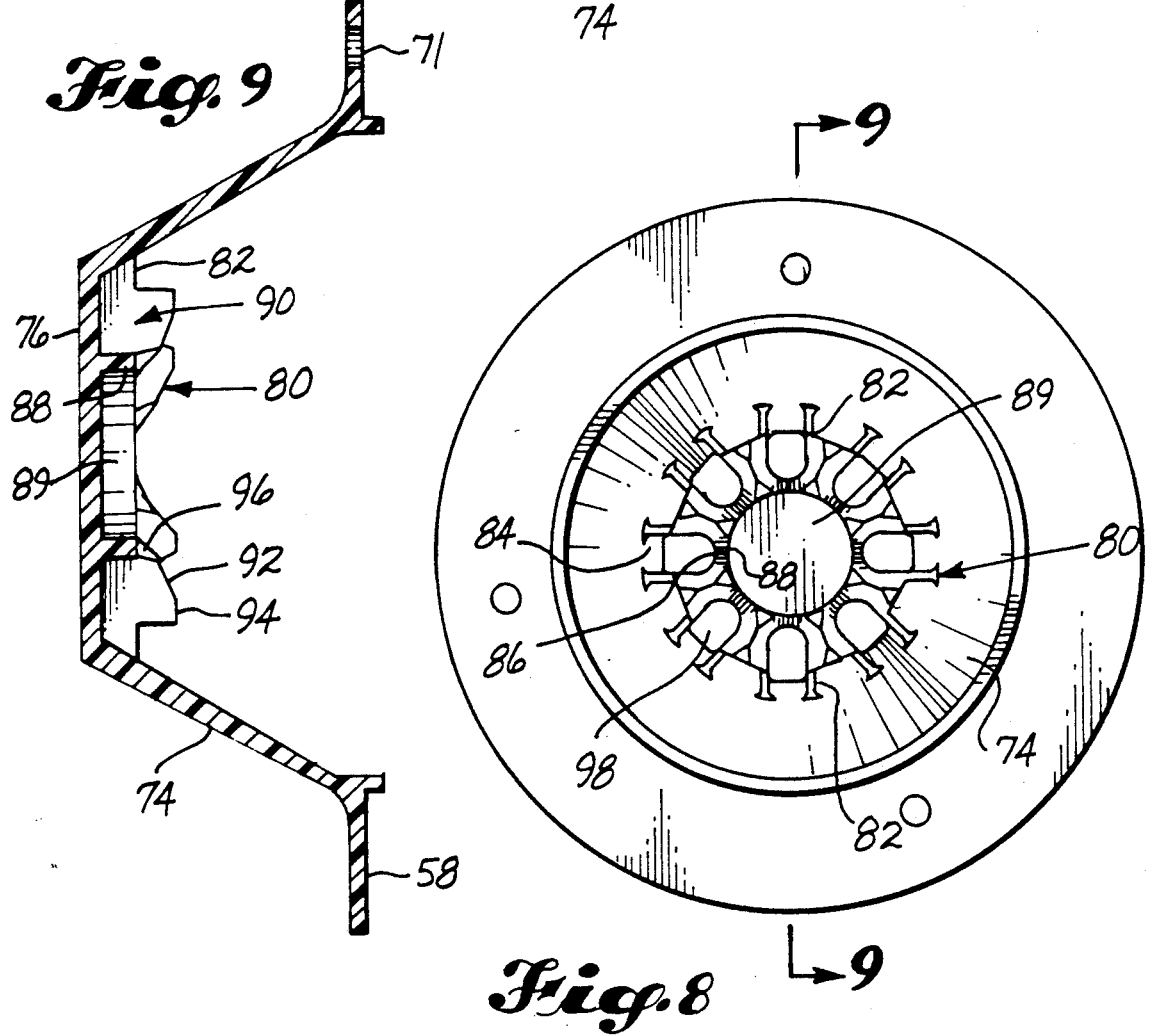
Fig. 9
Fig. 8

AIRCRAFT WHEEL HUBCAP

TECHNICAL FIELD

The present invention pertains to a cap for covering a hub of an aircraft wheel.

BACKGROUND OF THE INVENTION

On a number of commercial aircraft each of the landing gear wheels includes a conventional hubcap. The hubcap functions to protect components located inside the wheel hub, such as the anti-skid transducer. In addition, the hubcap provides an aerodynamic surface for reducing drag.

There are several disadvantages to the conventional hubcaps. For one, these hubcaps are made from individual pieces which are heavy and time consuming to manufacture and assemble. In addition, the conventional hubcaps may not be symmetrically balanced thereby causing excessive vibration of the landing gear and aircraft, and increased wear and tear on the wheel assembly. Other problems associated with the conventional hubcaps include their inability to rapidly dissipate heat from the wheel assembly, as well as problems in maintaining proper engagement of the anti-skid mechanism with the hubcap.

SUMMARY OF THE INVENTION

In order to overcome these problems, there is provided in the present invention a cap for covering an aircraft wheel hub containing an anti-skid transducer therein. The cap includes an annular flange portion which is fastened to the wheel hub and a conical sidewall portion having a wider circular end which is connected to the annular flange portion and a narrower circular second end which is connected to a circular end plate. The present invention also includes means, connected to an inside surface of the end plate, for engaging the transducer in a manner that rotation of the cap is transmitted to the transducer. Means also are provided for attaching the cap to the wheel hub in a manner that an airflow passageway is formed between the transducer and an inner surface of the sidewall such that the size of the airflow passageway increases due to an increasing distance between the inner surface of the sidewall and the transducer when proceeding in an axial direction along the transducer away from the end plate.

BRIEF DESCRIPTION OF THE DRAWINGS

The present invention will be described in greater detail in the following detailed description, in which:

FIG. 1 is an isometric view of a conventional hubcap;

FIG. 2 is a plan view showing the inside of the conventional hubcap;

FIG. 3 is a side sectional view of the conventional hubcap;

FIG. 5 is an isometric view showing an aircraft landing gear assembly including the hubcap of the present invention;

FIG. 6 is an exploded isometric view showing a portion of a conventional wheel hub and anti-skid mechanism as well the hubcap of the present invention;

FIG. 7 is an isometric view of the hubcap of the present invention;

FIG. 8 is a plan view showing the inside of the hubcap of the present invention;

FIG. 9 is a side sectional view of the hubcap of the present invention; and

DETAILED DESCRIPTION

Figure 4:
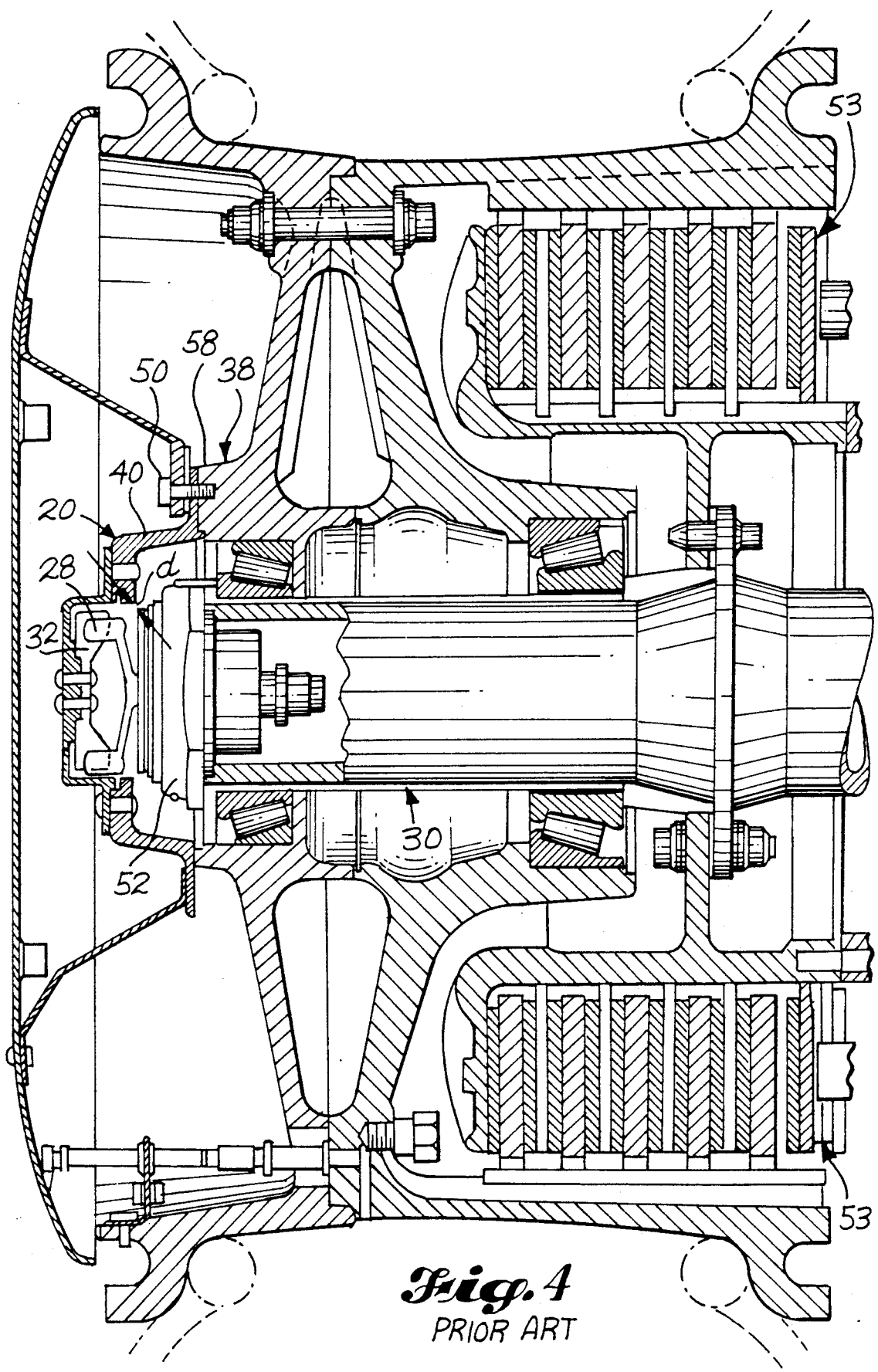
FIG. 4 is a side sectional view of a conventional wheel and brake assembly which includes the conventional hubcap.

Before describing the present invention, a discussion of a conventional aircraft wheel hubcap shown in FIGS. 1 through 4 will be provided. The conventional hubcap, generally indicated at 20, is made from various metal alloys. The hubcap 20 includes a base portion indicated at 22 as well as an endcap indicated 24 which is fastened to the base portion by rivets 26. In order to engage fingers 28 attached to the left end of an internal anti-skid transducer 30 (FIG. 4), a spider 32 (FIG. 1) is fastened to the inside surface of the endcap 24 by rivets 34. During rotation of the aircraft wheel, the rivets 34 sometimes shear due to the large torsional forces applied to the spider by the transducer fingers 28 which rotate with the hubcap.

In this conventional hubcap, the base portion 22 (FIG. 1) includes a wider diameter annular flange 36 which is fastened to a wheel assembly indicated at 38 (FIG. 4), as well as an integral cylindrical sidewall 40 (FIG. 1) which is connected to the flange 36. The sidewall 40 is generally perpendicular to flange 36 and is capped by a narrower diameter annular flange 42. The endcap 24, which has a shape that is similar to the base portion 22, includes a lower annular flange 44 which is integrally attached to a perpendicular cylindrical sidewall 46, which in turn is capped by an integral endplate 48.

Referring again to FIG. 4, the conventional hubcap 20 is fastened to the aircraft wheel assembly 38 by rivets 50. Inside the wheel assembly 38, the cylindrical anti-skid transducer 30 includes an end drive coupling 52 to which there is attached the two fingers 28 which are engaged by the spider 32. In this manner, rotation of the wheel (or lack thereof) and hubcap therewith is sensed by the transducer 30 and a signal is fed to an anti-skid mechanism (not shown) for regulating the braking of the aircraft in a conventional manner.

Braking of the wheel is accomplished by a conventional stator and rotor brake assembly indicated at 53. During braking, heat generated by the brake assembly 53 is transferred to the wheel assembly 38 and to the hubcap 20. The hubcap, being made from various metal alloys, conducts much of this heat to the spider 32 and spider rivets 34. Since the base portion 22 and endcap 24 are made from dissimilar metals, they expand at different rates thereby promoting misalignment of the spider 32 with the transducer fingers 28. As shown in FIG. 4, a distance, designated by the dimension "d", between the left end of the transducer body and the inner surface of the sidewall 40 is relatively narrow and thus minimizes any airflow around the inside of the hubcap. This dimension decreases when the hubcap gets hot and expands.

Having described the conventional hubcap, which also will be referred to later, attention now will be turned to the aircraft hubcap of the present invention. In FIG. 5 there is shown a conventional landing gear assembly indicated at 54 including a pair of wheels 56 each of which includes a conventional wheel hub 58 (only one of which is shown). Fastened to the inside of the wheel hub 58 is the hubcap of the present invention which is designated by the number 60. Overlying the hubcap 60 is a conventional fairing 62 which is fastened to the wheel assembly.

Referring now to FIG. 7, the hubcap 60 includes an annular base flange 70 which is fastened to the wheel hub 58 through holes 71 by rivets 72 (FIG. 6). Integrally connected to the inner perimeter of the base flange 70 is a conical dome formed by a sidewall 74 which intersects the base flange 70 at an angle x (shown in FIG. 7) of approximately one hundred and thirty five degrees. The end of the sidewall 74 is capped by an integral endplate 76 which is parallel to the base flange 70.

In order to engage the fingers 52 (FIG. 6) of the anti-skid transducer, there is integrally connected to the inside surface (FIG. 8) of the endplate 76 a spider indicated at 80. The spider 80 is formed by a number of U-shaped ribs 82 each having its open end 84 attached to the inside surface of the sidewall 74 and its curved end 86 terminating at a circular center wall 88 which has its center located in the center of the end plate 76. In this manner, the center wall 88 forms a recessed pocket 89 which is spaced apart from the end of the drive coupling 52 to form an air passageway therebetween. Further support is provided by connecting the back surface of the ribs 82 to the inside surface of the endplate 76. To further promote this airflow, the central axis of the transducer is aligned with the center of the pocket 89.

In order to prevent slippage of the transducer fingers within the spider 80, there is connecting each set of adjacent U-shaped ribs 82 a respective tooth indicated at 90 which is integrally connected to the inside surface of the endplate 76 and which extends above the top of the ribs 72 (FIG. 9). As best shown by FIGS. 8 and 9, each tooth 90 has a triangular cross-sectional configuration including a inclined ridge 92 which rises away from the inside surface of the endplate 76 when proceeding in a radial direction away from the center of the endplate. The upper end of the ridge 92 terminates at a small plateau 94, whereas the lower end of the ridge 92 terminates at a slope 96 which bottoms at the top of the center wall 88. In this manner, the fingers 52 are held in slots 98 (FIG. 8) formed by the U-shaped ribs 72. In the present invention, the teeth 90 aid in retaining the transducer fingers in the slots 98. In the event the fingers slip out of the slots, the triangular shape of each tooth insured that the fingers will rapidly re-enter adjacent slots.

In a preferred embodiment the hubcap 60 is made in one piece from a thermoplastic material such as polyetherether ketone. Whereas the conventional hubcap consists of several pieces held together by fasteners, and whereas each piece is fabricated from a different metal alloy, the lightweight hubcap of the present invention is made in one piece by conventional injection molding techniques. In the present invention, the spider 80 (FIG. 8) is integrally fastened to the endplate 76 at the ribs 72 and teeth 90, and therefore is not susceptible to shearing. Furthermore, the unitized construction allows for more precise balancing than is encountered with the conventional hubcap.

A further advantage of the present invention is that the conical shape of the sidewall 74 provides increased strength to the hubcap. More specifically, the conical sidewall is the most efficient method of reacting the torsional loads from the spider 80 (where the loads are generated) to the hubcap fastener rivets 72 (FIG. 6) located in the base flange 70 (where the loads are transferred to the wheel assembly). Unlike the conventional hubcap 20 (FIG. 1) in which the load path between the end plate 48 and the base flange 36 follows a number of ninety degree bends, in the present invention the load path is a direct line along sidewall 74 which is the optimum path for reacting these loads.

Figure 10:
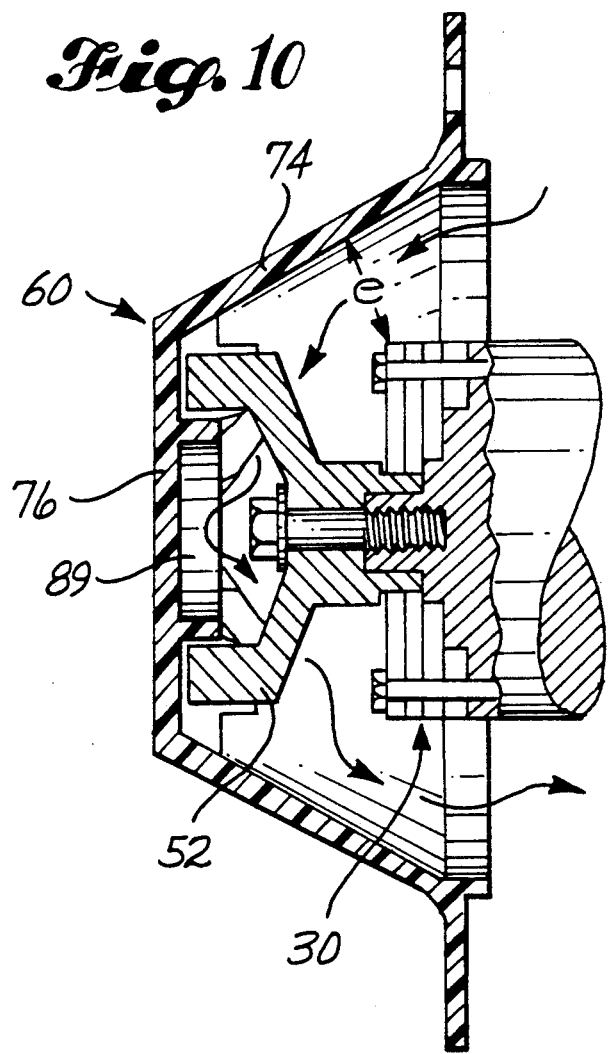
FIG. 10 is a side sectional view of the hubcap of the present invention as well as a portion of a conventional anti-skid mechanism which is located inside the hubcap.

As mentioned earlier, a problem associated with the conventional hubcap is the rapid generation of heat by the wheel braking assembly during braking of the aircraft. If this heat is not properly dissipated, damage to the wheel assembly and anti-skid transducer can result. In the present invention, the airflow around the anti-skid sensor is improved as a result of the conical shape of the sidewalls. More specifically, as shown in FIG. 10, the increased distance, designated by the dimension "e", between the left end of the transducer body and the sidewall 74 allows air to flow throughout the hubcap. Moreover, due to the conical shape of the hubcap, the distance between the inner surface of the sidewall 74 and the surface of the transducer increases when proceeding in an axial left-to-right direction (in FIG. 10) away from the endplate 76. This large annular passageway promotes the flow of air along the inside of the hubcap and around the end of the transducer via center pocket 89.

More specifically, the path of airflow is shown by arrows in FIG. 10. In the present invention, the hubcap is fabricated from a nonconductive thermoplastic. Therefore, much of the heat generated by the braking assembly and which is present in the wheel assembly, is not conducted to the hubcap. This allows the hubcap to remain relatively cool thereby cooling the heated air which flows inside the hubcap.

Thus, unlike the conventional hubcap which had vertical sidewalls and required flanges in order to join the various parts together, the one piece construction of the present invention allows the hubcap to have a conical configuration for maximum strength and heat dissipation.

What is claimed is:

1. A cap for covering an aircraft wheel hub containing an anti-skid transducer therein, the transducer including a body and at least one finger which is attached to the body, the cap comprising:
   a. an annular flange portion which has an inner perimeter;
   b. a conical sidewall portion having a wider circular end which is connected to the inner perimeter of the annular flange portion and a narrower circular second end;
   c. a circular end plate which is connected to the second end of the sidewall portion;
   d. means, connected to an inside surface of the end plate, for engaging the transducer in a manner that rotation of the cap, due to rotation of the wheel hub, is transmitted to the transducer;
   e. means for attaching the cap to the wheel hub in a manner that a first airflow passageway is formed between the transducer body and an inner surface of the sidewall such that the size of the first airflow passageway increased due to an increasing distance between the inner surface of the sidewall and the transducer body when proceeding in an axial direction along the transducer body away from the end plate; and
   f. the transducer engaging means further includes a plurality of slots for receiving the transducer finger therein, the slots being located on the end plate so that a portion of a wall forming each slot forms an inner wall about the center of the end plate which forms a second passageway which is in communication with the first passageway so as to to permit the flow of air along the sidewall and end plate of the cap.

2. The apparatus as set forth in claim 1 wherein:
a. the transducer body has a generally cylindrical configuration; and
b. the cap is positioned such that a longitudinal axis of the cap is coincident with a longitudinal axis of the transducer in a manner that an increasing distance between the sidewall and the transducer body when proceeding in an axial direction along the transducer body away from the end plate results in an increasing size of the first airflow passageway.

3. The cap as set forth in claim 2 wherein the cap is a molded single piece.

4. The cap as set forth in claim 2 wherein the cap is made from a material which is substantially nonconductive to heat so as to reduce heat transfer from the wheel hub to the cap.

5. A method of making and installing a cap for an aircraft wheel having an internal anti-skid transducer so as to dissipate heat generated in the wheel, the transducer including a body and at least one finger which is attached to the body, the method comprising the steps of:
a. providing a material which is resistant to heat conduction;
b. forming the material into a single piece hubcap such that the hubcap includes
   (1) an annular flange portion which has an inner perimeter,
   (2) a conical sidewall portion having a wider circular end which is connected to the inner perimeter of the annular flange portion and a narrower circular second end,
   (3) a circular end plate which is connected to the second end of the sidewall portion and,
   (4) a plurality of slots for receiving the transducer finger therein, the slots being located on the end plate so that a portion of a wall forming each slot forms an inner wall about the center of the end plate so as to form a first passageway for permitting he flow of air along the end plate of the cap; and
c. attaching the cap to the wheel hub in a manner that a second passageway, is formed between the transducer body and an inner surface of the sidewall wherein the size of the second passageway increased due to an increasing distance between the inner surface of the sidewall and the transducer body when proceeding in an axial direction along the transducer away from the end plate so as to allow heat from the wheel hub to be conducted through the first and second passageways for cooling therewithin.

6. The method as set forth in claim 5 wherein:
a. the transducer body has a generally cylindrical configuration; and
b. during the attaching step, the cap is positioned such that a longitudinal axis of the cap is coincident with a longitudinal axis of the transducer in a manner that an increasing distance between the sidewall of the cap when proceeding in an axial direction along the transducer away from the end plate results in a increasing size of the second passageway.

7. A cap for covering an aircraft wheel hub containing an anti-skid transducer therein, the transducer including a body and at least one finger which is attached to the body, the cap comprising:
a. a sloped sidewall having a first end and a second end;
b. an end plate which is connected to the second end of the sidewall;
c. means, connected to the end plate, for engaging the transducer in a manner that rotation of the cap, due to rotation of the wheel hub, is transmitted to the transducer;
c. means for attaching the cap to the wheel hub in a manner that a first passageway is formed between the transducer body and the sidewall such that the size of the first passageway increases due to an increasing distance between the sidewall and the transducer body when proceeding in an axial direction along the transducer body away from the end plate; and
e. the transducer engaging means further includes a plurality of slots for receiving the finger therein, the slots being located on the end plate so that a portion of a wall forming each slot forms an inner wall about the center of the end plate so as to form a second passageway which is in communication with the first passageway so as to permit the flow of air through the first and second passageways along the sidewall and end plate of the cap.

* * * * *